2,881,233

POLYMERIZATION OF OLEFINS IN PRESENCE OF NICKEL OXIDE-SILICA-ALUMINA CATALYST CONTAINING AN ALKALINE MATERIAL

Alfred Clark, Bartlesville, Okla., assignor to Phillips Petroleum Company, a corporation of Delaware No Drawing. Application September 15, 1955
Serial No. 534,603

10 Claims. (Cl. 260—683.15)

The invention relates to a process for polymerizing olefins utilizing a nickel oxide-silica-alumina catalyst promoted with an alkaline compound.

The conversion of olefins to hydrocarbons of higher molecular weight by polymerization reactions is well known. In some instances, such polymerization reactions may be accomplished solely by the application of heat and pressure, but in many cases the use of a catalyst is desirable. In general, catalysts cause polymerization reactions to proceed at lower temperature, decrease the number and types of polymeric materials formed, and increase the yield of desired products. Many individual materials already have been found that are active for the polymerization of olefins. It is well established that no catalyst is the exact equivalent of any other catalyst and that products differing not only in molecular weight but also in molecular structure may be prepared through the use of different catalysts when polymerizing the same olefins under comparable reaction conditions.

The present invention provides a catalyst by which an advantageous conversion of olefin hydrocarbons to polymeric materials, especially to 1-olefins, may be effected. The catalyst of this invention, comprising an alkaline material in combination with nickel oxide supported on silica-alumina carrier material, produces a polymeric material having a higher percentage of 1-olefins than the polymeric material formed using a nickel oxide catalyst supported on silica-alumina without the alkaline promoter. It is believed that the presence of an alkaline material in the catalyst of the present invention reduces the tendency of the catalyst to cause double bond isomerization, thus producing 1-olefins.

The principal object of the invention is to provide an improved process for catalytically polymerizing olefins. Another object of the invention is to provide an improved catalyst for polymerizing olefins. A further object of the invention is to provide an improved process for polymerizing olefins utilizing a promoted nickel oxide-silica-alumina catalyst to produce a larger yield of 1-olefins than is obtained from such a catalyst without the promoter. It is also an object of the invention to provide a process for catalytically polymerizing ethylene to liquor polymer containing a larger proportion of 1-olefins, particularly 1-butene, than has hitherto been possible. Other objects of the invention will become apparent from a consideration of the accompanying disclosure.

This invention provides a novel process for the polymerization of olefin hydrocarbons to form polymeric materials, especially 1-olefins, for example, the production of 1-butene by the polymerization of ethylene, said process comprising subjecting the olefinic feed material to a temperature from atmospheric to 500° F., a pressure from atmospheric to 2000 p.s.i. or above, and a space velocity up to 200 LHSV, in contact with a nickel oxide-silica-alumina catalyst promoted with either an alkali metal (Li, Na, K, Rb, and Cs) or alkaline earth metal (Ca, Sr, and Ba) compound, preferably with a sodium compound, e.g., sodium hydroxide.

In the catalyst of this invention it is essential that the nickel oxide-silica-alumina be alkalized with a small amount of an alkali. Compounds of the alkali metals (Li, Na, K, Rb, Cs) are suitable. Of these, the compounds of sodium are preferred. The alkaline earth metals (Ca, Sr, and Ba) exert a similar effect and their compounds may be used in place of the alkali metal compounds. The alkali or a mixture of alkalis may be incorporated into the catalyst in the form of various compounds such as the nitrate, hydroxide, acetate, sulfate, carbonate and the like. It is believed that these compounds are converted, at least in part, to the oxides during the preparation and/or use of the catalyst.

The proportion of alkaline material incorporated into the catalyst of this invention may vary over a wide range, but generally the total amount of alkaline material employed ranges from 0.05 to about 5 weight percent, or more, preferably 0.5 to 3 weight percent based on the weight of the finished catalyst. The total amount of nickel oxide incorporated into the catalyst ranges from 0.1 to 10 percent by weight or higher, based on the weight of the finished catalyst, and calculated as elemental nickel. The silica-alumina support for the alkaline material and nickel oxide preferably contains predominantly silica as a base constituent which is preferably in the range of 50 to 99 percent by weight of the support. The alumina content preferably ranges from 1 to 50 weight percent. However, a silica-alumna base of any range of these components is operable in the invention.

The catalyst of this invention may be prepared by methods known in the art, such as impregnation and the like. When preparing the catalyst by impregnation, the carrier in the form of powder, granules or pellets, is immersed in an aqueous solution of suitable soluble salts of alkali and nickel, whereupon the carrier absorbs a portion of the solution. The impregnation may be performed using separate solutions of the nickel and alkaline compound, but the catalytic material formed is preferably dried before being impregnated with the second solution. The catalyst composite formed by any method is dried at a temperature in the range of 400–900° F. for a period of about 3 hours and then calcined in an oxygen-containing atmosphere at a temperature in the range of 800–1150° F., preferably 900–1100° F., for a period of time of at least 3 hours and preferably longer to reduce the water content of the material and to assure that the nickel is present as the oxide. It is believed that the alkaline material is converted at least in part to the oxide during calcination. If the catalyst is not in a suitable form for contacting operations, it may be comminuted, admixed with Sterotex, pelleted, and heated at an elevated temperature to remove the Sterotex and to activate the catalyst. The catalyst of this invention may also be prepared from commercially available nickel oxide-silica-alumina catalysts by impregnating the commercial catalyst with a solution of an alkaline material; for example, a nickel oxide-silica-alumina catalyst may be impregnated with sodium hydroxide, dried and calcined to produce a suitable catalyst.

Polymerization reactions utilizing the alkalized nickel oxide catalyst of this invention may be performed with a wide variety of polymerizable olefinic compounds to be found in either refinery gases or elsewhere. For example, the invention is particularly well adapted to the polymerization of ethylene, propylene, n-butylene, isobutylene, and up to and including $C_5$ olefins of either a straight chain or a branched chain character may be employed. Catalyst poisons, such as carbon monoxide, sulfur compounds, organic oxygen-containing compounds, and the like, are preferably excluded from the polymerization feed. The polymerization temperature may vary within a rather wide range depending on the other reaction conditions, the olefin hydrocarbons to be polymerized, and the products to be formed. In general, the temperature will not be much lower than room temperature nor appreciably above about 500–600° F. Preferably, the temperature is maintained in the range of about room temperature to about 300° F. The liquid hourly space velocity may be as high as about 20, but ordinarily a liquid hourly space velocity of less than about 10 is used in a liquid-phase process with fixed-bed catalyst. Hydrocarbon diluents that can be used include the paraffins and/or cycloparaffins. The pressure used is preferably high enough to maintain the olefins in the liquid phase and, in a process in which a diluent is used, high enough to maintain the diluent in liquid phase and to assure that the olefins not liquefied under these conditions are sufficiently dissolved in the liquid phase present. Ordinarily a pressure of 100–300 p.s.i.g. is used; however, pressures up to 2000 p.s.i. or more may be employed.

The ensuing example illustrates the invention but is not to be interpreted as unduly limiting the same.

EXAMPLE

Ethylene was polymerized in a series of four runs over an alkalized nickel oxide-silica-alumina catalyst and a standard nickel oxide-silica-alumina catalyst. The data for these runs are presented in the table below.

An alkaline promoted catalyst was prepared by impregnating a 90 silica-10 alumina commercial catalyst with an aqueous solution containing the amount of NaOH required to give a final catalyst containing two weight percent NaOH. All NaOH was absorbed by the silica-alumina, since the remaining liquid changed from basic to neutral. After the water was decanted, the catalyst base was dried under an infrared lamp. The base was then impregnated with an aqueous solution of nickel nitrate containing 40 weight percent of the salt. The catalyst, after draining off excess solution, was dried under an infrared lamp, and the nickel nitrate was converted to the oxide by heating at 950 to 1000° F. in a stream of air. This catalyst was analyzed and found to contain 5.91 weight percent nickel oxide, calculated as elemental nickel, 2.0 weight percent alkali calculated as NaOH, and the rest silica-alumina. The standard catalyst, containing no NaOH, was prepared by the same procedure except that the NaOH-impregnation step was omitted. This catalyst contained 6.41 weight percent nickel oxide, calculated as elemental nickel, and the remainder silica-alumina.

Table

| Run | 1 | 2 | 3 | 4 |
|---|---|---|---|---|
| Catalyst age, hours | 4.67 | 4.41 | 8.01 | 13.76 |
| NaOH in catalyst | No | Yes | Yes | Yes |
| Feed, composition, weight percent: | | | | |
| Ethylene | 22.7 | 25.4 | 29.7 | 23.2 |
| Cyclohexane | 77.3 | 74.6 | 70.3 | 76.8 |
| Ethylene SV, v./v./hr | 605 | 1,050 | 2,730 | 520 |
| Cyclohexane SV, v./v./hr | 3.3 | 5.0 | 10.4 | 2.8 |
| Reactor conditions: | | | | |
| P.s.i. | 340 | 390 | 390 | 390 |
| Average temperature, °F | 131 | 151 | 139 | 141 |
| Bath temperature, °F | 101 | 100 | 90 | 110 |
| Ethylene conversion, percent | 98.3 | 79.1 | 51.8 | 74.6 |
| Polymer composition, weight percent: | | | | |
| 1-butene | 8.7 | 34.6 | 34.7 | 37.5 |
| 2-butene | 35.8 | 33.0 | 34.2 | 31.7 |
| Hexenes | 30.4 | 26.6 | 23.2 | 17.7 |
| Octenes and heavier | 25.1 | 5.8 | [1] 7.9 | 13.1 |
| Composition of hexenes, weight basis: | | | | |
| Trans-internal | 33 | 33 | 42 | 47 |
| Vinyl | 1 | 14 | 23 | 18 |
| Branched vinyl | <1 | 0 | 1 | 1 |
| Branched-internal | 6 | 8 | 9 | 11 |
| Cis-internal | 5 | 1 | 4 | 4 |

[1] Includes 2.4 percent of unidentified material.

The data presented in the above example and table clearly show the advantageous effect of the alkaline promoter in the catalyst in increasing the yield of 1-olefin, specifically 1-butene, when polymerizing ethylene and the decrease in the yield of octenes and heavier polymer as compared with such a catalyst without the alkaline promoter.

Certain modifications of the invention will become apparent to those skilled in the art and the illustrative details disclosed are not to be construed as imposing unnecessary limitations on the invention.

I claim:

1. A process for polymerizing $C_2$ to $C_5$ olefins comprising contacting at least one of said olefins under polymerizing conditions with a catalyst comprising nickel oxide-silica-alumina containing a minor but modifying amount of at least 0.5 weight percent of at least one alkaline compound of the group consisting of alkali and alkaline earth metal compounds convertible to metal oxide upon heating so as to produce polymer comprising 1-olefin.

2. The process of claim 1 wherein said catalyst contains an amount of said alkaline compound in the range of 0.5 to 3 weight percent of the catalyst.

3. A process for polymerizing a $C_2$ to $C_5$ olefin comprising contacting at least one of said olefins under polymerizing conditions with a catalyst comprising silica-alumina containing nickel oxide in the range of 0.1 to 10 weight percent (calculated as Ni) and at least one alkaline compound of the group consisting of alkali and alkaline earth metal compounds convertible to metal oxide upon heating in the range of 0.5 to 3 weight percent of the catalyst so as to produce polymer containing a larger concentration of 1-olefin polymer than is produced by a similar catalyst without said alkaline compound.

4. The process of claim 3 wherein the olefin feed comprises ethylene and said 1-olefin is 1-butene.

5. A process for polymerizing $C_2$ to $C_5$ olefins comprising contacting at least one of said olefins under polymerizing conditions with a catalyst comprising a silica-alumina base containing from 50 to 99 weight percent silica and from 50 to 1 weight percent alumina, said base being impregnated with from 0.1 to 10 weight percent nickel oxide (calculated as Ni) and from 0.5 to 3 weight percent alkaline compound of the group consisting of alkali and alkaline earth metal compounds convertible to metal oxide upon heating, said polymerizing conditions including a temperature in the range of atmospheric to 500° F., a pressure in the range of atmospheric to 2000 p.s.i.g. sufficient to maintain liquid-phase, and a space velocity up to 20 LHSV, so as to produce polymer comprising 1-olefin.

6. The process of claim 5 wherein said alkaline compound is incorporated in said catalyst as NaOH.

7. The process of claim 5 wherein the feed comprises ethylene and NaOH is incorporated in the catalyst.

8. The process of claim 7 wherein the feed comprises ethylene admixed with a hydrocarbon diluent selected from the group consisting of paraffins and cycloparaffins.

9. A process for polymerizing $C_2$ to $C_5$ olefins comprising contacting at least one of said olefins under polymerizing conditions with catalyst consisting essentially of nickel oxide-silica-alumina and a minor but modifying amount of at least 0.5 weight percent of at least one alkaline compound of the group consisting of alkali and alkaline earth metal compounds convertible to metal oxide upon heating so as to produce polymer comprising 1-olefin.

10. A process for polymerizing a $C_2$ to $C_5$ olefin comprising contacting at least one of said olefins under polymerizing conditions with a catalyst consisting essentially of silica-alumina containing nickel oxide in the range of 0.1 to 10 weight percent (calculated as Ni) and at least one alkaline compound of the group consisting of alkali and alkaline earth metal compounds convertible to metal oxide upon heating in the range of 0.5 to 3 weight percent of the catalyst so as to produce polymer containing a larger concentration of 1-olefin polymer than is produced by a similar catalyst without said alkaline compound.

References Cited in the file of this patent

UNITED STATES PATENTS

| | | |
|---|---|---|
| 2,507,864 | Moore et al. | May 16, 1950 |
| 2,606,940 | Bailey et al. | Aug. 12, 1952 |
| 2,706,211 | Clark | Apr. 12, 1955 |
| 2,710,854 | Seeling et al. | June 14, 1955 |
| 2,717,888 | Feller et al. | Sept. 13, 1955 |
| 2,767,160 | Field et al. | Oct. 16, 1956 |